(12) United States Patent  
King et al.

(10) Patent No.: US 8,146,813 B2
(45) Date of Patent: Apr. 3, 2012

(54) METHODS AND APPARATUS PROCESSING CONTAINER IMAGES AND/OR IDENTIFYING CODES FOR FRONT END LOADERS OR CONTAINER HANDLERS SERVICING RAIL CARS

(75) Inventors: Henry King, Moraga, CA (US); Toru Takehara, Hayward, CA (US)

(73) Assignee: Paceco Corp., Hayward, CA (US)

( * ) Notice: Subject to any disclaimer, the term of this patent is extended or adjusted under 35 U.S.C. 154(b) by 383 days.

(21) Appl. No.: 12/262,130

(22) Filed: Oct. 30, 2008

(65) Prior Publication Data
US 2009/0108065 A1 Apr. 30, 2009

Related U.S. Application Data (60) Provisional application No. 60/983,888, filed on Oct. 30, 2007.

(51) Int. Cl.
G06F 19/00 (2011.01)
(52) U.S. Cl. .................. 235/385; 235/375; 235/454
(58) Field of Classification Search ........... 235/385, 235/454, 375; 340/10.1
See application file for complete search history.

(56) References Cited

U.S. PATENT DOCUMENTS

| 5,917,602 | A | 6/1999 | Bonewitz et al. |
| 5,926,268 | A | 7/1999 | Bonewitz et al. |
| 7,231,065 | B2 | 6/2007 | Peach et al. |
| 2003/0191555 | A1 | 10/2003 | Takehara et al. |
| 2004/0126015 | A1 | 7/2004 | Hadell |
| 2004/0215367 | A1 | 10/2004 | King et al. |
| 2005/0027435 | A1* | 2/2005 | Scheppmann ............ 701/117 |
| 2006/0153455 | A1 | 7/2006 | Takehara et al. |
| 2008/0191937 | A1* | 8/2008 | Wisherd et al. ......... 342/357.03 |
| 2008/0213067 | A1* | 9/2008 | Jegers ................. 414/139.4 |

* cited by examiner

Primary Examiner — Ahshik Kim
(74) Attorney, Agent, or Firm — GSS Law Group (57) ABSTRACT

An optical characteristic system configured to couple to a container handler for transferring a container to/from a rail car. A server interface configured to receive from at least one container handler. An optical characteristic system configured to couple to a front end loader. A container handler configured to transfer at least one container to/from a rail car and to report its container image, optical characteristic, container code estimate of the container, a rail car identifier estimate and/or a container chassis identifier estimate. A rail kiosk configured to receive the container image, etc from at least one container handler to create the optical characteristic, the container code estimate, manifest for the rail car, confirmation of the manifest and/or an insurance record for the container. A method operating at least one of the server interface, the rail kiosk and a container inventory management system and the products of those operations.

25 Claims, 6 Drawing Sheets

Fig. 9C ional Patent Application No. 60/983,888 filed Oct. 30, 2007, which is incorporated herein by reference.

METHODS AND APPARATUS PROCESSING CONTAINER IMAGES AND/OR IDENTIFYING CODES FOR FRONT END LOADERS OR CONTAINER HANDLERS SERVICING RAIL CARS

CROSS REFERENCE TO RELATED APPLICATIONS

This patent application claims the benefit of Provisional Patent Application No. 60/983,888 filed Oct. 30, 2007, which is incorporated herein by reference.

TECHNICAL FIELD

This invention relates to operating at least one camera to create an image of a container by an apparatus on a container handler or included in a container handler, or other apparatus communicating with the container handler apparatus, and/or estimating the container's code from a container in stowed in an area or while the container handler is servicing a rail car.

BACKGROUND OF THE INVENTION

Optical characteristic systems are used in container shipping and storage yards, but have had some problems. Frequently the optical characteristic system is mounted on a quay crane or at the terminal gate and report an estimate of the container code of a container being handled by the crane or terminal gate OCR system, along with at least one container image of the container code. The problem with these systems is that containers cannot be imaged in the rail area of a terminal.

SUMMARY OF THE INVENTION

There are several embodiments of this invention that may differ in various ways, but may include and are not limited to a number of features that may be found in the implementations of some other embodiments. Various embodiments of the invention address the problem with the prior art by allowing for other container handlers to OCR containers in the terminal including the rail yard.

A first embodiment of the invention includes an optical characteristic system configured to couple to a container handler configured to transfer a container to/from a rail car to create at least one member of the optical group. The optical group consists of a container image of at least part of at least one face of the container, an optical characteristic derived from the container image, a container code estimate of a container code on the face, a rail car identifier estimate of a rail car identifier on the rail car and a container chassis identifier estimate for a container chassis that may hold the container during at least part of the transfer.

A second embodiment of the invention includes a server interface configured to receive the at least one member of the optical group from at least one of the container handler to create another of the members of the optical group and/or a manifest for at least the rail car and/or a confirmation of the manifest and/or an insurance record for the container.

The container handler may be a front end loader, a reach stacker, or a gantry crane. The front end loader may be a top handler or a side picker. The gantry crane may be a quay crane and/or a rail gantry crane. Alternatively, the gantry crane may be a rubber tire gantry crane.

A third embodiment of the invention includes an optical characteristic system configured to couple to a container handler configured to transfer a container to create at least one member of the optical group, where the container handler is a front end loader.

A fourth embodiment of the invention includes a container handler configured to transfer at least one container to/from a rail car and configured to report at least one member of the optical group.

A fifth embodiment of the invention includes a rail kiosk configured to receive at least one member of the optical group from at least one container handler to create another of the members of the optical group and/or a manifest for at least the rail car and/or a confirmation of the manifest and/or an insurance record for the container.

The sixth embodiment of the invention operates a rail kiosk configured to receive at least one member of the optical group from at least one container handler configured to transfer a container and/or operates the server interface to receive from the container handler and/or the optical characteristic system for the container transferred to/from the rail car and/or operates the container inventory management system to receive from the rail kiosk and/or the server interface.

It may be preferred that the insurance record is created using at least one of the container images for each of at least two members of the face group of the container. The face group consists of a top face, a bottom face, a front face, a back face, a left face and a right face, each of the container.

It may be preferred that the optical characteristic derived from the container image includes an optical enhancement of the container image. It may also be preferred that the optical characteristic further includes a compression of the container image and/or the optical enhancement.

In certain embodiments, the container handler and/or the optical characteristic system may include a processor communicatively coupled to at least one camera configured to create the container image of the container, possibly for transfer to/from the rail car. The processor may also be communicatively coupled to a means for communicating to send at least one member of the optical group.

In certain embodiments, the server interface and/or the rail kiosk may include a second processor communicatively coupled to a second means for communicating to receive the member of the optical group from a container handler and/or from an optical characteristic system coupled to the container handler, possibly with the container handler transferring the container to/from a rail car. The second processor may create at least one items discussed above for the server interface and/or the rail kiosk.

At least one of the processors may include at least one instance of at least one of a finite state machine, a neural network, an inferential engine, and a computer accessibly coupled to a computer readable memory including a program system and/or an installation package configured to affect the program system. In some embodiments, the installation package may create the program system and/or modify an existing program system to implement various combinations of program steps that will be discussed later.

The container handler and/or the optical characteristic system may be configured to wirelessly report at least one of the optical group members. The server interface and/or the rail kiosk may be configured to wirelessly receive the report.

The container handler and/or the optical characteristic system may further include a sensor module to create a position estimate that may be used to direct the camera to create the container image.

DETAILED DESCRIPTION

This invention relates to operating at least one camera to create an image of a container by an apparatus on a container handler or included in a container handler, or other apparatus communicating with the container handler apparatus, and/or estimating the container's code while the container handler is servicing a rail car.

Figure 1:
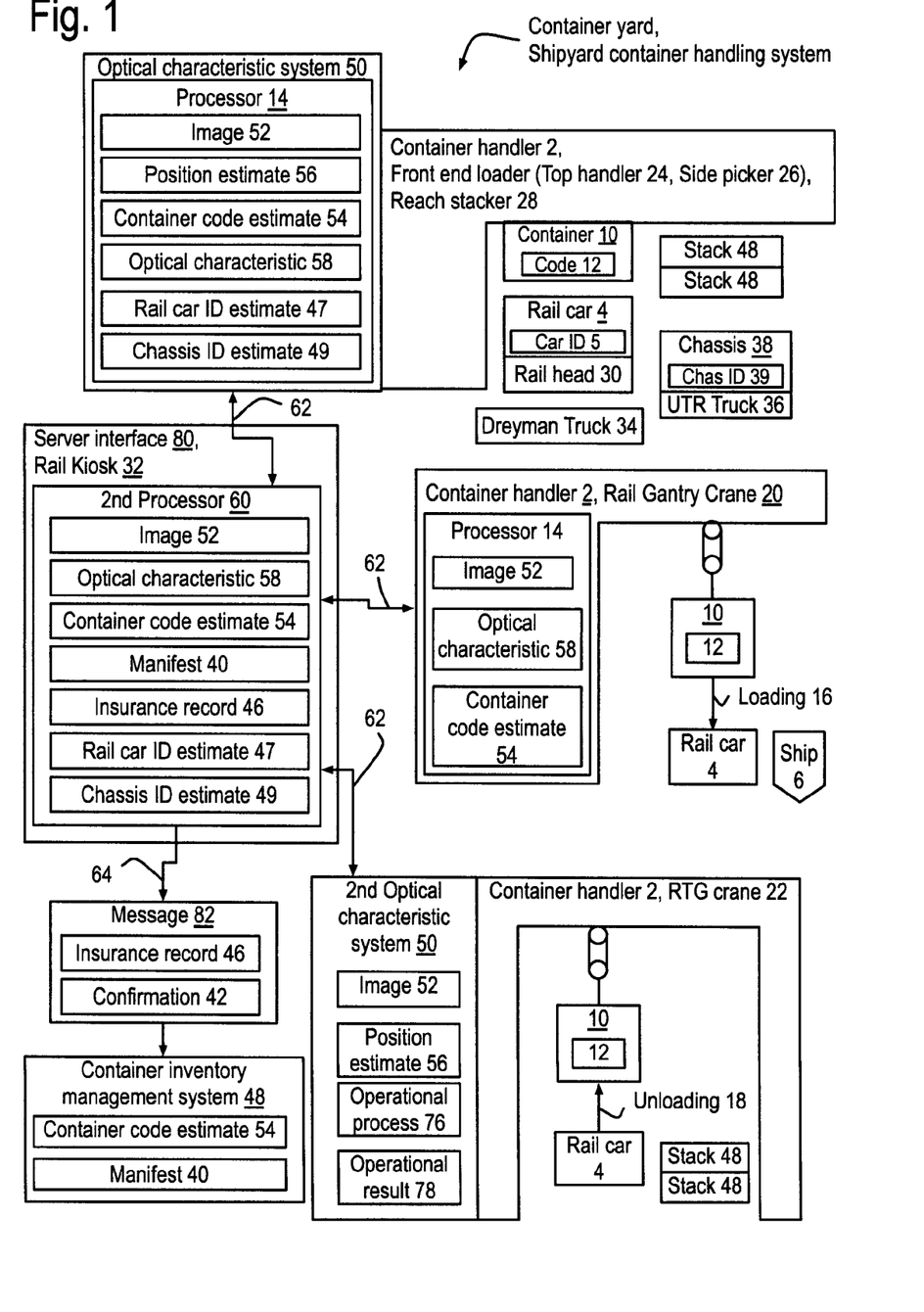
FIG. 1 shows an example of a container yard and/or a shipyard container handling system including all seven embodiments of the invention in operation in a yard storing and/or transferring containers with each of the containers including a container code and possibly using at least one rail car.

FIG. 1 shows an example of a container yard and/or a shipyard container handling system including all seven embodiments of the invention in operation storing and/or transferring containers 10 with a container code 12 and possibly using at least one rail car 4. These embodiments will be summarized first and then discussed in greater detail with regards this and the subsequent Figures. Various embodiments of the invention may involve a container handler 2 transferring containers to and/or from a rail car 4 and reporting a container code estimate 54 and/or an optical characteristic 58 and/or a container image 52 of the container handled by the container handler as well as a rail car identifier estimate 47 of a rail car identifier 5 on the rail car and a container chassis identifier estimate 49 for a container chassis 38 that may hold the container during at least part of the transfer. As used herein the relationship "to and/or from" will be referred to as "to/from".

A first embodiment of the invention includes an optical characteristic system 50 configured to couple to a container handler 2 configured to transfer a container 10 to/from a rail car 4 to create at least one member of an optical group. The optical group consists of a container image 52 of at least part of at least one face of the container, an optical characteristic 58 derived from the container image and an container code estimate 54 of a container code 12 on the face of the container as well as the rail car identifier estimate 47 of the rail car identifier 5 on the rail car and the container chassis identifier estimate 49 of the Chassis identifier 39 as marked on the container chassis 38 that may hold the container during at least part of the transfer.

A second embodiment of the invention includes a server interface 80 configured to receive the at least one member of the optical group from at least one container handler 2 to create another of the members of the optical group and/or a manifest 40 for at least the rail car 4 and/or a confirmation 42 of the manifest and/or an insurance record 46 for the container 10.

The container handler 2 may be a front end loader, a reach stacker 28, or a gantry crane. The front end loader may be a top handler 24 or a side picker 26. The gantry crane may be a quay crane 20 and/or a rail gantry crane 20. Alternatively, the gantry crane may be a rubber tire gantry crane 22.

The third embodiment of the invention may also include an optical characteristic system 50 configured to couple to a container handler 2 configured to transfer a container 10 to create at least one member of the optical group, where the container handler is a front end loader, for example, a top handler 24 or a side picker 26. As used herein a top handler may move a container in a forklift fashion and side pickers, which may also be referred to as side handlers, may operate similarly to top handlers but are frequently used for lifting at least partly empty containers from the side to speed the movement of such containers.

A fourth embodiment of the invention includes the container handler 2 configured to transfer at least one container 10 to/from a rail car 4 and configured to report at least one member of the optical group, for example, the container image 52, the optical characteristic 58 and/or the container code estimate 54 as well as the rail car identifier estimate 47 of the rail car identifier 5 on the rail car and the container chassis identifier estimate 49 for the identification of chassis identifier 39 as marked on container chassis 38 that may hold the container during at least part of the transfer.

A fifth embodiment of the invention includes a rail kiosk 32 configured to receive at least one member of the optical group from at least one container handler 2 to create another of the members of the optical group and/or a manifest 40 for at least the rail car 4 and/or a confirmation 42 of the manifest and/or an insurance record 46 for the container 10.

The sixth embodiment of the invention includes a container inventory management system 48 configured to receive from the server interface 80 and/or the rail kiosk 32 at least one of the following: the container code estimate 54, the manifest 40, the confirmation 42 and/or the insurance record 46 as well as the rail car identifier estimate 47 of the rail car identifier 5 on the rail car and the container chassis identifier estimate 49 for the identification of chassis identifier 39 as marked on container chassis 38 that may hold the container during at least part of the transfer.

The seventh embodiment of the invention operates a rail kiosk 32 configured to receive at least one member of the optical group from at least one container handler 2 configured to transfer a container 10 and/or operate the server interface 80 to receive from the container handler 2 and/or the optical characteristic system 50 for the container transferred to/from the rail car 4 and/or operate the container inventory management system 48 to receive from the rail kiosk and/or the server interface.

In various embodiments of the invention, a container handler 2 and/or an optical characteristic system 50 may be communicatively coupled 62 with the server interface 80 and/or the rail kiosk 32.

It may be preferred that the container 10 be at least twenty feet long. By way of example, the size of the container may be ten feet, twenty feet, twenty four feet, thirty three feet, forty five feet or fifty three feet.

It may be preferred that the optical characteristic 58 derived from the container image 52 includes an optical enhancement of the container image. The optical enhancement may include the removal of glare, color correction, edge enhancement, contrast adjustment and any image filter as found in a software tool for image processing of digital photos and/or digital videos. It may also be preferred that the optical characteristic further includes a compression of the container image and/or the optical enhancement. The compression may comply with an international standard, preferably a version of JPEG or MPEG.

The container handler 2 and/or the optical characteristic system 50 may include a processor 14 communicatively coupled to at least one camera 6 configured to create the container image 52 of the container 10, possibly for transfer to/from the rail car. The processor may also be communicatively coupled to a means for communicating 106 to send at least one member of the optical group.

The processor 14 may receive the container image 52 as a raw version to create a filtered version, a compressed version, and/or an enhanced version of the image as the optical characteristic 58. The filtered version may remove or attenuate certain frequency bands of the raw version. The compressed version may require smaller storage capacity than the raw version. And the enhanced version may enhance contrast and/or strengthen edges detected in the raw version.

The server interface 80 and/or the rail kiosk 32 may include a second processor 60 to receive via the communicative coupling 62 the member of the optical group from the container handler 2 and/or from the optical characteristic system 50 coupled to the container handler. The container handler may be transferring the container to/from a rail car 4. The second processor may create at least one items discussed above for the server interface and/or the rail kiosk.

As shown in FIG. 1, some embodiments of the invention may operate a container handler 2 loading 60 or unloading 16 the rail car 4 and reporting the container estimate 54 and/or optical characteristic 58 and/or a container image 52 of a container 10 handled by the container handler.

A rail car 4 may be stopped in a container terminal servicing at least one dock configured to load 60 and/or unload 62 a ship 64 and/or in a rail yard for transferring containers between at least one rail line and at least one trucking route configured for draymen trucks 34 and/or at least one warehouse (not shown) and/or at least one factory (not shown). Sometimes a container may be transferred to a rail car from a ship 64, to a rail car from a stack 48, to a rail car from a drayman, or to a rail car from a UTR truck 36 and/or a container chassis 38. Or the container may be transferred from a rail car to a stack, from a rail car to a vessel, or from a rail car to a drayman. A rail head 30 will refer to a site where a rail car may be stopped and a container may be transferred onto or off of the rail car.

Some embodiments may manage a container inventory system 48 based upon receiving 64 the container code estimate 54 and/or the optical characteristic 58 and/or container image 52 for a container 10 being transferred by a rail car 4 in contact with a container yard, which may be a shipyard.

Some embodiment methods may include optically recognizing container codes 12 of containers 10 in transfer operations involving draymen trucks 34 and stacks 48 of containers in particular by front end loaders. As used herein, a drayman vehicle is a land transport vehicle frequently comprising a truck and at least one trailer which can transport containers within a container terminal and over public roads and highways. The spelling of drayman may include dreyman.

Various embodiments of the invention may operate in a container storage and/or transfer yard, which may service container ships, railroads, overland trucks, factories and/or warehouses supporting the automated recognizing of container codes 12 displayed on various sides of the containers 10 being stored and/or transferred. At least one processor 14, 124 and/or 60 may initiate an operational process 76 by an optical characteristic system 50 mounted on a container handler 2 to create an operational result 78, select the operational process based upon an operational schedule 130 and/or communicate 62 with at least one of the optical characteristic systems to receive at least one container image 52 of a container 10 being handled by the container handler to at least partly create a container code estimate 54 for transmission to a container inventory management system 48.

Figure 2:
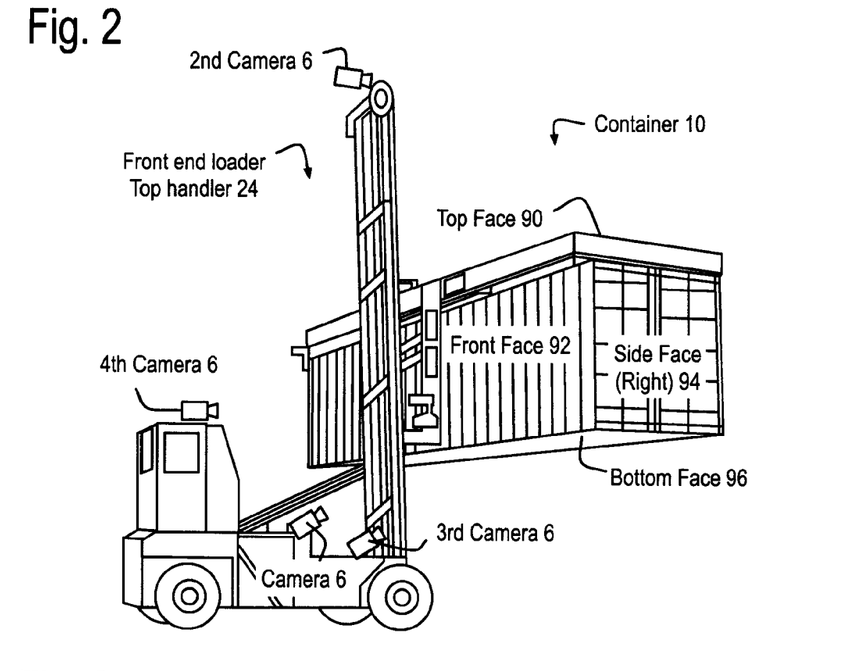
FIG. 2 shows an example of a front end loader, in particular a top handler, coupled to multiple cameras configured to create images of various faces of the container.

FIG. 2 shows an example of a front end loader (FEL), in particular a top handler 24, coupled to multiple cameras configured to create images of various faces of the container 10.

It may be preferred that the insurance record 46 is created using at least one of the container images 52 for each of at least two members of the face group of the container. The face group consists of a top face 90, a bottom face 96, a front face 92, a back face, a side face 94, which may be a left face and a right face, each of the container 10, as shown in FIG. 2.

Figure 3:
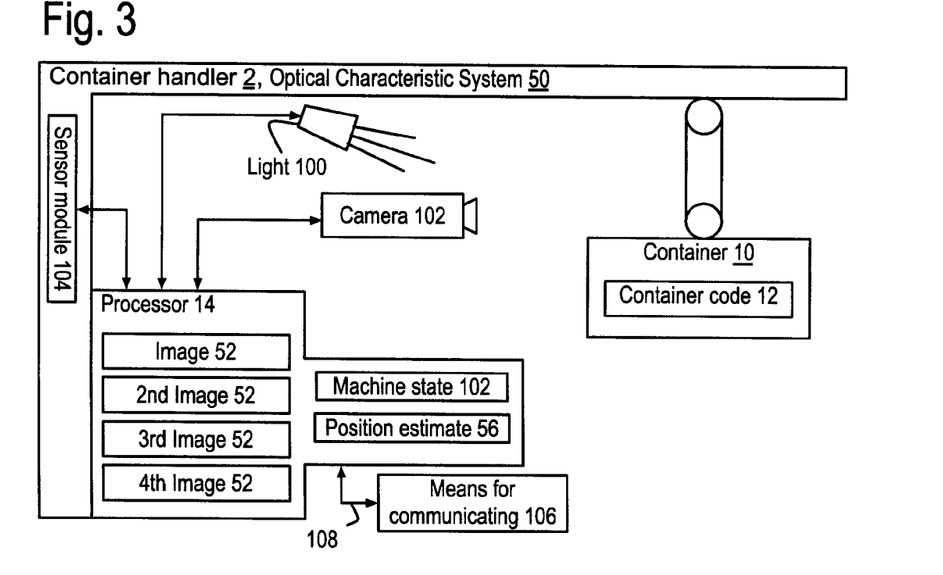
FIG. 3 shows some details of the optical characteristic system and/or the container handler, including at least one light and at least one camera, both may preferably coupled to the processor with a sensor module to create a machine state used to determine a position estimate and a means for communicating.

FIG. 3 shows some details of the optical characteristic system 50 and/or the container handler 2 of FIG. 1, including at least one light 100 and at least one camera 102, both may preferably be coupled to the processor 14 to receive at least one container image 52. The processor may be coupled with a sensor module 104 to create a machine state 102 used to determine the position estimate 56 and communicatively coupled 108 with a means for communicating 106 to report the container image 52 and/or the optical characteristic 58 (as shown in FIG. 1) and/or the container code estimate 54. The position estimate may be used to direct the camera and/or the lights to improve the quality of the container image.

Returning to FIG. 2, the optical characteristic system 50 and/or the container handler 2 may include at least one camera 102 based upon the position estimate 56 of a container 10 to create the container image 52. The container image may be used to create a container code estimate of the container code 12 on a face of the container and/or be used as a front side image of the front face 92 of the container or to image longer containers (40 ft and greater). A second camera may be mounted near the top of the front end loader to create a second container image of the top face 90 of the container. A third camera may be mounted to focus a container image where a twenty foot container's container code 12 is found. A third camera may be mounted near the bottom of the front end loader to create a third container image of the bottom face 96 of the container. And a fourth camera may be positioned near the cab of the front end loader for capturing the container as it is moved for auditing purposes. A fifth camera maybe added to capture a drayman truck chassis ID 49 and/or rail car chassis identifier 5.

Figure 4:
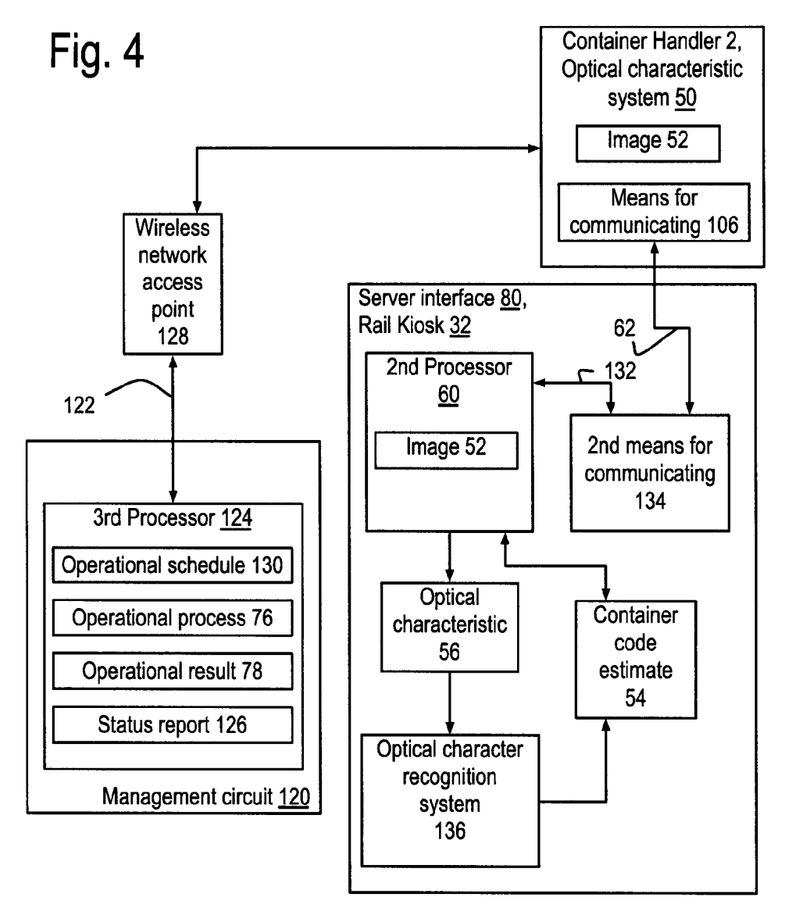
FIG. 4 shows a refinement of some aspects of FIG. 1, where the server interface and/or the rail kiosk further include the second processor communicatively coupled to a second means for communicating to receive the member of the optical group from a container handler and/or from an optical characteristic system coupled to the container handler, possibly with the container handler transferring the container to/from a rail car.

FIG. 4 shows a refinement of some aspects of FIG. 1, where the server interface 80 and/or the rail kiosk 32 further include the second processor 60 may be communicatively coupled 132 to a second means for communicating 134 to receive via the communicative coupling 62 the member of the optical group from a container handler 2 and/or from an optical characteristic system 50 coupled to the container handler, possibly with the container handler transferring the container 10 to/from a rail car 4. The second processor may create at least one items discussed above received by the server interface and/or the rail kiosk. The second processor may use an optical character recognition system 136 to create the container code estimate 54 from the optical characteristic 56 and/or from the container image 52 received from the container handler and/or the optical characteristic system.

The means for communicating 106 and/or the second means for communicating 134 may use a network protocol that complies with at least one member of the group consisting of: a wireless network protocol standard and a wireline network protocol, a time divisional multiple access protocol, a spread spectrum protocol, a packet transfer protocol, a frame transfer protocol, an error correction coding protocol and an encryption protocol.

The wireline network protocol, may further include at least one of the following: a Synchronous Serial Interface protocol, an Ethernet protocol, a Serial Peripheral Interface protocol, an RS-232 protocol, and Inter-IC protocol (sometimes abbreviated as I2C), a Universal Serial Bus (USB) protocol, a Controller Area Network (CAN) protocol, a firewire protocol, which may include implementations of a version of the IEEE 1394 protocol, an RS-485 protocol and/or an RS-422 protocol.

The container handler 2 and/or the optical characteristic system 50 may be configured to wirelessly report 62 at least one of the optical group members. The server interface 80 and/or the rail kiosk 32 may be configured to wirelessly receive the report.

The means for communicating 76 and/or the second means for communicating 134 and/or the wireless network access point 128 may include a radio frequency tag terminal and/or a radio frequency transmitter and receiver compliant with at least one wireless signaling convention that may implement at least one of a Time Division Multiple Access (TDMA) scheme, a Frequency Division Multiple Access (FDMA) scheme, and/or a spread spectrum scheme, such as:

examples of the TDMA scheme may include the GSM access scheme;

examples of the FDMA scheme may include the AMPs scheme;

the spread spectrum scheme may use at least one of a Code Division Multiple Access (CDMA) scheme, a Frequency Hopping Multiple Access (FHMA) scheme, a Time Hopping Multiple Access (THMA) scheme and an Orthogonal Frequency Division Multiple Access (OFDM) scheme;

examples of the CDMA scheme may include, but are not limited to, an IS-95 access scheme and/or a Wideband CDMA (W-CDMA) access scheme;

examples of the OFDM scheme may include, but are not limited to, a version of the IEEE 802.11 access scheme; and another example of a spread spectrum scheme is the ANSI 371.1 scheme for radio frequency identification and/or location tags.

Figure 5:
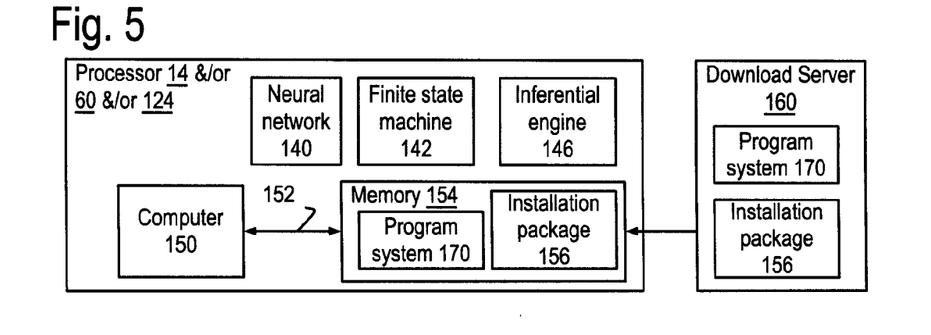
FIG. 5 any of the processors may include at least one instance of at least one of a neural network, a finite state machine, an inferential engine, and a computer accessibly coupled to a computer readable memory including a program system and/or an installation package configured to affect the program system. The program system may reside in a computer readable memory and/or an installation package, and/or a download server. The computer readable memory may be accessibly coupled to the computer as shown, or may not be accessibly coupled, which is not shown.

As shown in FIG. 5, at least one of the processors 14 and/or 60 and/or 124 may include at least one instance of at least one of a neural network 140, a finite state machine 142, an inferential engine 146, and a computer 150 accessibly coupled 152 to a computer readable memory 154 including a program system 170 and/or an installation package 156 configured to affect the program system. In some embodiments, the installation package may create the program system and/or modify an existing program system to implement various combinations of program steps that will be discussed later. The program system and/or the installation package may be provided through access with a download server 160. The access may be across an open network such as the Internet and/or through a private network as such a virtual private network or through the use of an access protocol possibly using a user name and a password.

As used herein, a neural network 140 maintains a collection of neurons and a collection of synaptic connections between the neurons. Neural networks are stimulated at their neurons leading through their synaptic connections to the firing of other neurons. Examples of neural networks include but are not limited to aromatic chemical compound detectors used to detect the presence of bombs and drugs.

As used herein, a finite state machine 132 receives at least one input, maintains and updates at least one state and generates at least one output based upon the value of at least one of the inputs and/or the value of at least one of the states.

As used herein, an inferential engine 134 maintains a collection of inference rules and a fact database and responds to queries and assertions by invoking rules and accessing the fact database. Examples of inferential engines include fuzzy logic controllers and constraint based decision engines used to determine paths through networks based upon the network constraints, such as the current location of parked and moving vehicles and available storage locations for containers.

As used herein, a computer 150 includes at least one data processor and at least one instruction processor instructed by the program system 170, where each of the data processors is instructed by at least one of the instruction processors.

Figure 6:
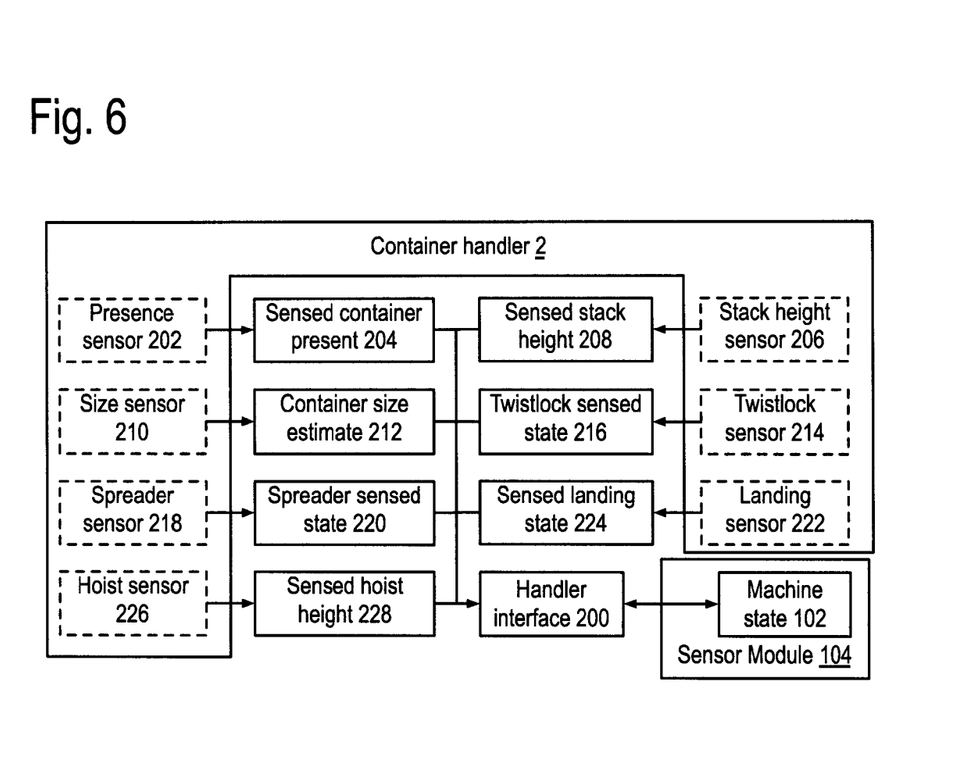
FIG. 6 shows some details of the sensor module and the machine state of FIG. 3.

As shown in FIGS. 3 and 6, the container handler 2 and/or the optical characteristic system 50 may further include a sensor module 104 to create a position estimate 56 that may be used to direct the camera 102 to create the container image 52. The camera may preferably be directed in coordination with the light 100.

FIG. 6 shows some further details of the sensor module 104 and the machine state 102 of the container handler 2 of FIG. 3. A presence sensor 202 may respond to the presence of a container 10 to create a sensed container present 204. A stack height sensor 206 may create a Sensed stack height 208. A Size sensor 210 may respond to the container being handled to create a Container size estimate 212. A Twistlock sensor 214 may create a Twistlock sensed state 216. A Spreader sensor 218 may create a Spreader sensed state 220. A Landing sensor 222 may create a Sensed landing state 224. And/or a Hoist sensor 226 may create a sensed hoist height 228. Any or all of the sensed states 62, 66, 70, 74, 78, 82, 86 and/or 90 may be included in the machine state. The sensor module may further communicate with a handler interface 200 to create the machine state.

The handler interface 200 may vary for different container handlers 2. For example when the container handler is a gantry crane such as rail gantry crane 20 or an RTG crane 22, the container handler may include a means to sense the crane spreader interface signals (landed, locked, container width), and may further, possibly separately couple to sensors on the crane hoist or trolley drum for determining the trolley and hoist position of the crane, for instance by using a tachometer, proximity sensor, optical sensor, encoder, or laser beam. Other embodiments of the handler interface may include a coupling to a Programmable Logic Controller (PLC) to capture this data. Also, the handler interface may include a wireline network interface to at least one of the sensors of the container handler. As used herein, a wireline network interface may implement an interface to at least one of the wireline network protocols mentioned herein.

Another example, when the container handler 2 is a side picker 26, a top handler 24 or a reach stacker 28, the handler interface 200 may include a wireline network interface to at least one of the sensors of the container handler. Other sensors may be accessible to the handler interface through separate wireline network interfaces and/or wireline network couplings.

A third example, when the container handler 2 is a UTR truck 36 or a container chassis 38, the handler interface 200 may include a wireline network interface to at least one, and possibly all the accessed sensors of the container handler. Alternatively, more than one wireline network interfaces and/or wireline network couplings may be used.

The handler interface 200 may further receive any or all of the following information that may be forwarded to the container inventory management system 48: the location of the container 10, a sensed operator identity of the operator operating the container handler 2, a container radio frequency tag, a container weight, a container damage estimate, an indication of the container handler moving in a reverse motion, a frequent stops count, a fuel level estimate, a compass reading, a collision state, a wind speed estimate, a vehicle speed, and an estimate of the state of a vehicle braking system.

The handler interface 200 may include a radio transceiver providing a radio frequency tag interface capable of locating the container handler 2 and/or identifying the container 10 and/or its container code 12.

The handler interface 200 may include another radio transceiver using a Global Positioning System and/or a Differential Global Position System to determine the location of the container 10.

The handler interface 200 may include an interface to a short range and/or low power radar that may provide a position estimate 56 of the container 10. The radar may preferably be non-toxic for humans and possibly livestock and other animals in or near the containers.

Figure 7:
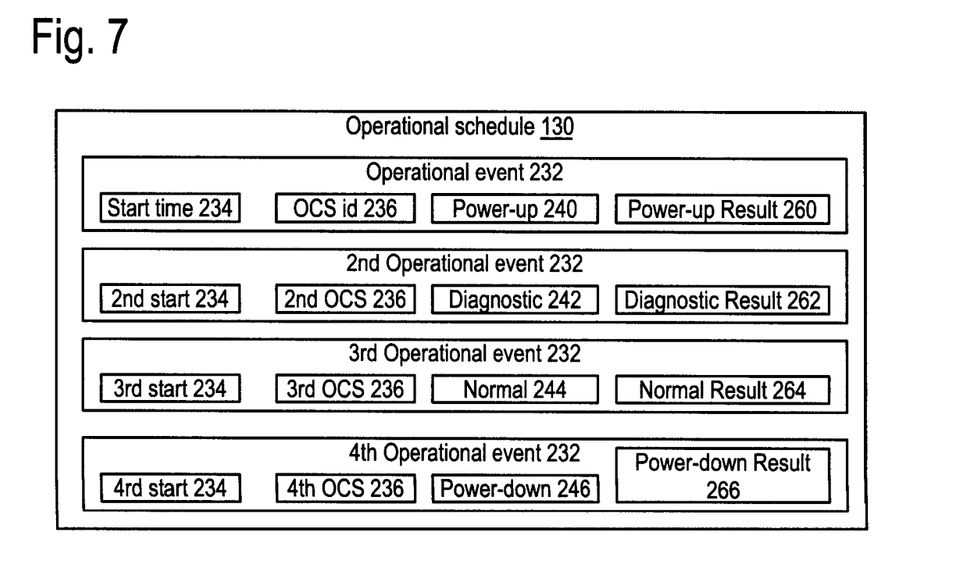
FIG. 7 shows an example of some of the details of the operational schedule of FIG. 1.

FIG. 7 shows an example of some of the details of the operational schedule 130 of FIG. 1, including multiple operational events 232, each including a start time 234, a list of identified optical characteristic systems 236, an operational process, and its operational result. The operational process may be a member of the group consisting of a power-up process 240, a diagnostic process 242, a normal process 244 and a power-down process 246.

Some of the following figures show flowcharts of at least one embodiment of at least one of the methods of the invention, which may include arrows signifying a flow of control, and sometimes data, supporting various implementations.

The boxes denote steps or program steps of at least one of the invention's methods and may further denote at least one dominant response in a neural network 140, and/or at least one state transition of the finite state machine 146, and/or at least one inferential link in the inferential engine 142, and/or a program step, or operation, or program thread, executing upon the computer 150.

Each of these steps may at least partly support the operation to be performed as part of a means for an operation or use. Other circuitry such as network interfaces, radio transmitters, radio receivers, specialized encoders and/or decoders, sensors, memory management and so on may also be involved in performing the operation further providing the means for the operation.

The operation of starting in a flowchart is denoted by a rounded box with the word "Start" in it and may refer to at least one of the following: entering a subroutine or a macro instruction sequence in the computer 150, and/or of directing a state transition of the finite state machine 146, possibly pushing of a return state, and/or entering a deeper node of the inferential engine 142 and/or stimulating a list of neurons in the neural network 140.

The operation of termination in a flowchart is denoted by a rounded box with the word "Exit" in it and may refer to completion of those operations, which may result in at least one of the following: a return to dormancy of the firing of the neurons in the neural network 140, and/or traversal to a higher node in the graph of the fact database and/or the rules collection in the inferential engine 142, and/or possibly return to a previously pushed state in the finite state machine 146, and/or in a subroutine return in the computer 150.

Figure 8:
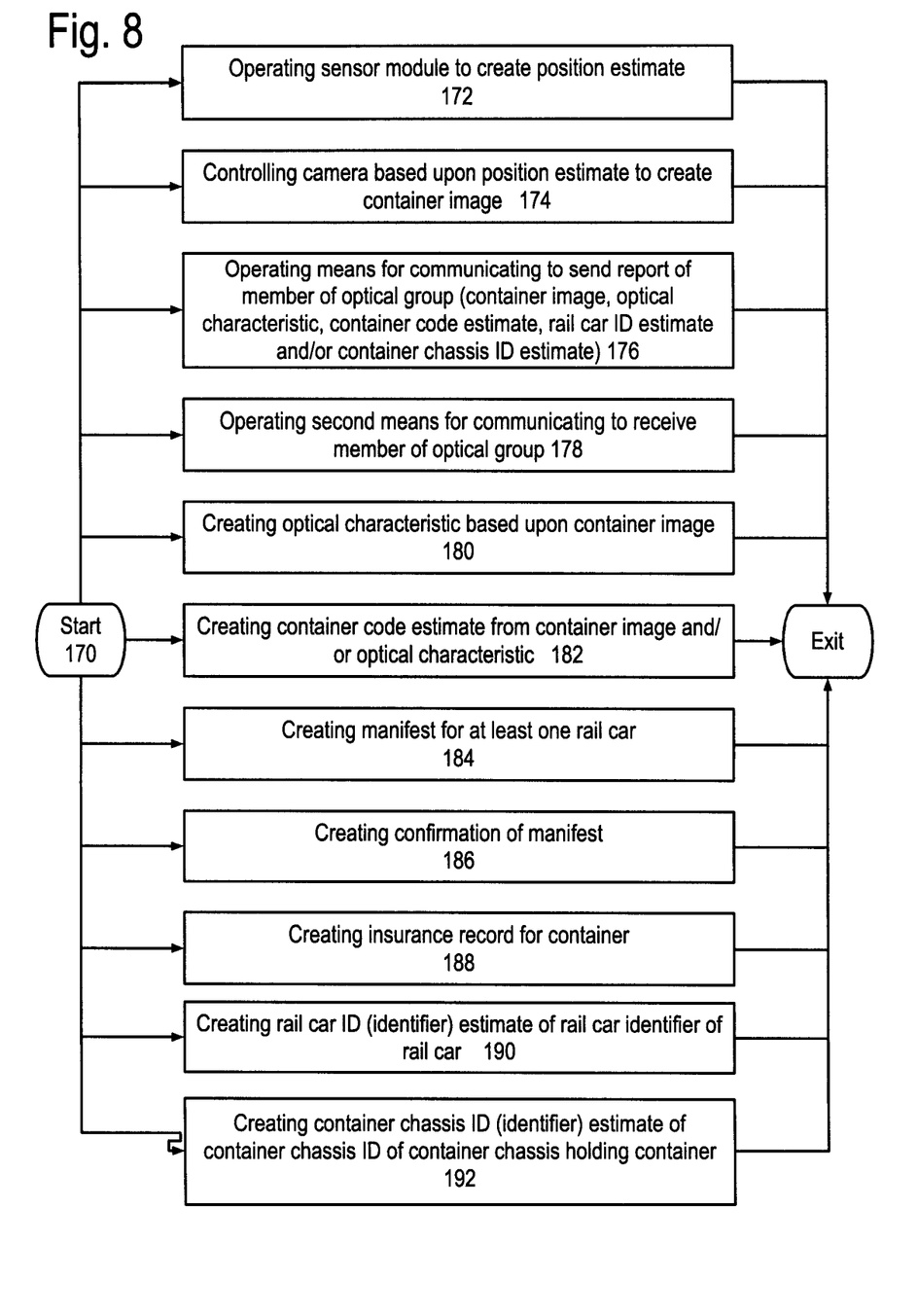
FIG. 8 shows a flowchart of the program system of FIG. 5.

FIG. 8 shows a flowchart of the program system 170 of FIG. 5 as including at least one of the following program steps: Program step 172 supports operating the sensor module 104 to create the position estimate 56 of the container 10 as shown in FIG. 3. Program step 174 supports controlling the camera 6 based upon the position estimate to create the container image 52. Program step 176 supports operating the means for communicating 106 to send the report of the member of the optical group, in particular the container image 52, the optical characteristic 104, the container code estimate 54 as well as the rail car identifier estimate 47 of the rail car identifier 5 on the rail car and the bomb cart or container chassis identifier estimate 49 for the container chassis 38 that may hold the container during at least part of the transfer. Program step 178 supports operating the second means for communicating 134 to receive the report of the member of the optical group as shown in FIG. 4. Program step 180 supports creating the optical characteristic based upon the container image. Program step 182 supports creating the container code estimate from the container image and/or the optical characteristic. Program step 184 supports creating the manifest 40 for the rail car 4, preferably based upon the container code estimate as generated by the rail kiosk 32 in some embodiments of the invention. Program step 186 supports creating the confirmation 42 of the manifest 40 from the container code estimate derived from the container image sent by the container handler 2 and/or the optical characteristic system 50. Program step 188 supports creating the insurance record 46 for the container, preferably through archiving two or more container images of the faces of the container as shown in FIG. 2. Program step 190 supports creating the rail car identifier estimate 47 of the rail car identifier 5 of the rail car 4 as shown in FIG. 1. And program step 192 supports creating the container chassis identifier estimate 49 of the container chassis identifier 39 of the container chassis 38 holding the container 10 for at least part of the transfer.

Figure 9A:
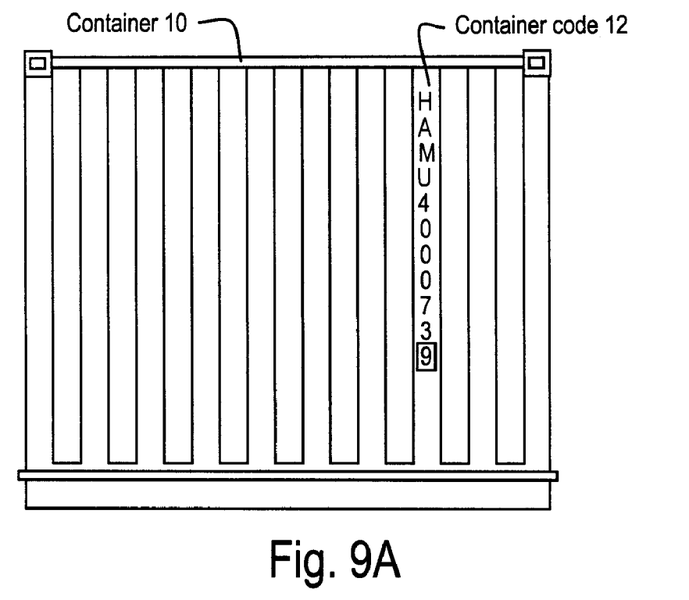
FIGS. 9A and 9B show some container images of the container code as displayed on various faces of the container.
Figure 9B:
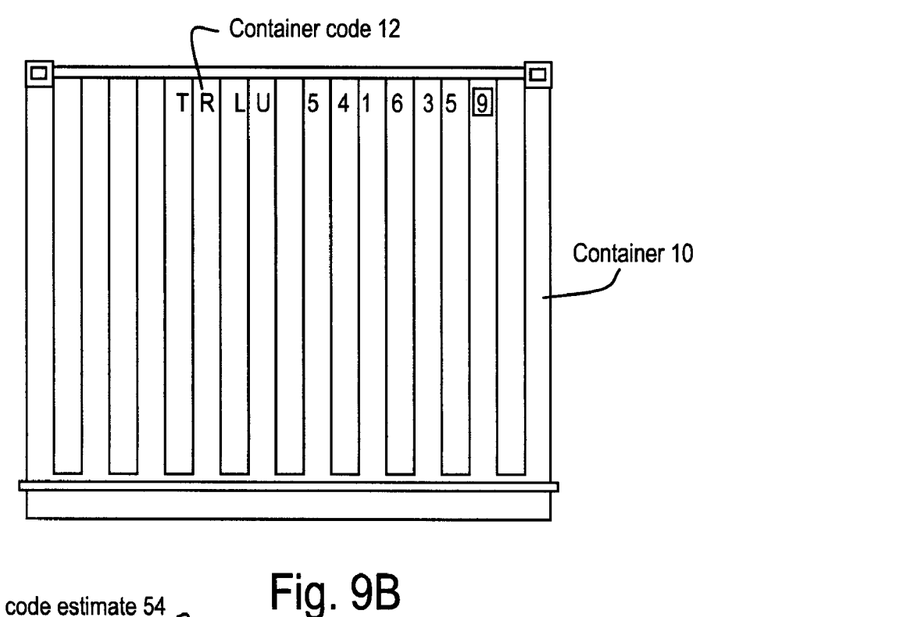
Figure 9C:
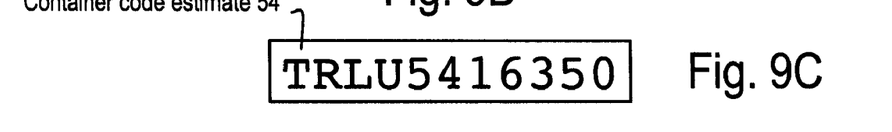
FIG. 9C shows a container code estimate derived from the container images.

FIGS. 9A and 9B show some example container images of the container code 12 as displayed on various faces of the container 10. And FIG. 9C shows a container code estimate 54 derived from one of these container images and/or an optical characteristic 56 as discussed previously. Rail car identifiers 5 and/or container chassis identifiers 39 may be implemented in a fashion similar to container codes and/or may be implemented using Radio Frequency Identification (RFID) technology.

The preceding embodiments provide examples of the invention, and are not meant to constrain the scope of the following claims.

What is claimed is:

1. An apparatus, comprising:
   at least one member of an optical group; and
   a container inventory management system configured to receive at least one member, and configured to also produce another at least one member, of the group consisting of
   a container code estimate of a container based upon at least one member of said optical group created by an optical characteristic system configured to couple to a container handler configured to transfer said container to/from a rail car,
   a manifest of said rail car,
   a confirmation of said manifest, and
   an insurance record for said container;
   wherein said optical group comprises
   a container image of at least part of at least one face of said container at least twenty feet long,
   an optical characteristic derived from said container image,
   a container code estimate of a container code,
   a rail car identifier of said rail car, and
   a container chassis identifier of a container chassis; and
   wherein said container handler is a member of the group consisting of a front end loader, a reach stacker, and a gantry crane.

2. The apparatus of claim 1,
   wherein said insurance record is created using at least one of said container images for each of at least one member of the face group of said container, said face group consisting of a top face, a bottom face, a front face, a back face, a left face and a right face, each of said container; and
   wherein said optical characteristic derived from said container image includes an optical enhancement of said container image.

3. The apparatus of claim 2, wherein said front end loader is a member of the group consisting of a top handler and a side picker;
   wherein said optical characteristic further includes a compression of at least one member of the group consisting of said container image and said optical enhancement; and
   wherein said gantry crane is a member of the group consisting of a quay crane, a rail gantry crane and a rubber tire gantry crane; and
   wherein said container handler is further configured to wirelessly report said at least one member of said optical group.

4. The apparatus of claim 2, further comprising a processor communicatively coupled to a means for communicating.

5. The apparatus of claim 4,
   wherein said processor includes at least one instance of at least one member of the group consisting of a finite state machine, a neural network, an inferential engine, and a computer accessibly coupled to a computer readable memory including at least one member of a program system and an installation package configured to affect said program system;
   wherein said means for wireless communicating includes at least one instance of at least one member of the group consisting of a wireless network interface compliant with a wireless network protocol, a wireline network interface compliant with a wireline network protocol, and a radio compliant with a radio communications protocol.

6. The apparatus of claim 5,
   wherein said program system includes at least one member of the group consisting of the program steps of:
   operating said means for communicating to send a report of said member of said optical group;
   operating said means for communicating to receive said member of said optical group;
   creating said optical characteristic based upon said container image;
   creating said container code estimate from at least one of said members of said group consisting of said container image and said optical characteristic;
   creating said manifest for said rail car;
   creating said confirmation of said manifest; and
   creating said insurance record for said container.

7. An apparatus, comprising:
   an optical characteristic system configured to couple to a container handler configured to transfer a container at least twenty feet long to/from a rail car to create at least one member of the optical group consisting of
   a container image of at least part of at least one face of said container,
   an optical characteristic derived from said container image and
   a container code estimate of a container code on said face,
   where said container handler is a member of the group consisting of a front end loader, a reach stacker, and a gantry crane;
   wherein said front end loader is a member of the group consisting of a top handler and a side picker;
   wherein at least one of said optical characteristic derived from said container image includes an optical enhancement of said container image;
   wherein said optical characteristic system comprises
   a processor communicatively coupled to at least one camera configured to create said container image of said container being transferred to/from said rail car; and
   said processor communicatively coupled to a means for communicating to send at least one member of said optical group.

8. The apparatus of claim 7,
   wherein said optical characteristic further includes a compression of at least one member of the group consisting of said container image and said optical enhancement; and
   wherein said gantry crane is a member of the group consisting of a quay crane, a rail gantry crane and a rubber tire gantry crane;
   wherein said optical characteristic system is further configured to wirelessly report said at least one member of said optical group.

9. The apparatus of claim 7, wherein said optical characteristic system further comprises said processor communicatively coupled with a sensor module to create a position estimate; and
   wherein said processor communicatively coupled to at least one camera configured to create said container image further comprises said processor configured to direct said camera based upon said position estimate to at least partly create said container image.

10. The apparatus of claim 9,
wherein said processor includes at least one instance of at least one member of the group consisting of a finite state machine, a neural network, an inferential engine, and a computer accessibly coupled to a computer readable memory including at least one member of a program system and an installation package configured to affect said program system;
wherein said sensor module includes at least one member of the group consisting of a presence sensor, a stack height sensor, a size sensor, a twistlock sensor, a spreader sensor, a landing sensor and a hoist sensor;
wherein said means for communicating includes at least one instance of at least one member of the group consisting of a wireless network interface compliant with a wireless network protocol, a wireline network interface compliant with a wireline network protocol, and a radio compliant with a radio communications protocol.

11. The apparatus of claim 10,
wherein said program system includes at least one member of the group consisting of the program steps of:
operating said sensor module to create said position estimate of said container;
controlling said camera based upon said position estimate to create said container image;
operating said means for communicating to send said report of said member of said optical group;
creating said optical characteristic based upon said container image;
creating said container code estimate from at least one of said container image and said optical characteristic;
creating a rail car identifier estimate of a rail car identifier of said rail car;
creating a container chassis identifier estimate of a container chassis estimate of a container chassis holding said container for part of said transfer;
creating a manifest for said rail car;
creating a confirmation of said manifest; and
creating an insurance record for said container.

12. An apparatus, comprising:
a container handler configured to transfer at least one container at least twenty feet long to/from a rail car and configured to wirelessly report at least one member of the optical group consisting of
a container image of at least part of at least one face of said container,
an optical characteristic derived from said container image and
a container code estimate of a container code on said face;
wherein at least one of said optical characteristic derived from said container image includes at least one of
an optical enhancement of said container image, and
a compression of at least one member of the group consisting of said container image and said optical enhancement;
wherein said container handler a member of the group consisting of a reach stacker, a gantry crane, and a front end loader is one of a top handler and a side picker,
wherein said gantry crane is one of a quay crane, a rail gantry crane and a rubber tire gantry crane;
wherein said container handler comprises
a processor communicatively coupled to at least one camera configured to create said container image of said container being transferred to/from said rail car; and
said processor communicatively coupled to a means for communicating to send at least one member of said optical group.

13. The apparatus of claim 12, wherein said container handler further comprises said processor communicatively coupled with a sensor module to create a position estimate; and
wherein said processor communicatively coupled to said at least one camera configured to create said container image further comprises said processor configured to direct said camera based upon said position estimate to at least partly create said container image.

14. The apparatus of claim 13,
wherein said processor includes at least one instance of at least one member of the group consisting of a finite state machine, a neural network, an inferential engine, and a computer accessibly coupled to a computer readable memory including at least one member of a program system and an installation package configured to affect said program system;
wherein said sensor module includes at least one member of the group consisting of a presence sensor, a stack height sensor, a size sensor, a twistlock sensor, a spreader sensor, a landing sensor and a hoist sensor;
wherein said means for communicating includes at least one instance of at least one member of the group consisting of a wireless network interface compliant with a wireless network protocol, a wireline network interface compliant with a wireline network protocol, and a radio compliant with a radio communications protocol.

15. The apparatus of claim 14, wherein said program system includes at least one member of the group consisting of the program steps of:
operating said sensor module to create said position estimate of said container;
controlling said camera based upon said position estimate to create said container image;
operating said means for communicating to send said report of said member of said optical group;
creating said optical characteristic based upon said container image; and
creating said container code estimate from at least one of said container image and said optical characteristic.

16. An apparatus comprising:
a rail kiosk configured
to receive at least one member of an optical group from at least one container handler and/or an optical characteristic system coupled to said container handler, said container handler configured to transfer a container at least twenty feet long, to create at least one member,
and further to produce another of at least one member, of the group consisting of
another of said members of said optical group,
a manifest for a rail car involved with said transfer of said container,
a confirmation of said manifest, and
an insurance record for said container;
wherein said optical group consists of
a container image of at least part of at least one face of said container,
an optical characteristic derived from said container image,
a container code estimate of a container code on said face,
a rail car identifier estimate of a rail car identifier on said rail car, and
a container chassis identifier estimate of a container chassis identifier of a container chassis holding said container during at least part of said transfer.

17. The apparatus of claim 16, wherein said container handler a member of the group consisting of a front end loader, a reach stacker, and a gantry crane;
- wherein said insurance record is created using at least one of said container images for each of at least two members of the face group of said container, said face group consisting of a top face, a bottom face, a front face, a back face, a left face and a right face, each of said container; and
- wherein said optical characteristic derived from said container image includes an optical enhancement of said container image; and
- wherein said rail kiosk further comprises
- a second processor configured to receive said member of said optical group; and
- said second processor is configured to create at least one member of the group consisting of
- said optical characteristic from said container image;
- said container code estimate from at least one member of the group consisting of said container image and said optical characteristic,
- said manifest for said rail car,
- said confirmation of said manifest, and
- said insurance record for said container.

18. The apparatus of claim 17, wherein said front end loader is a member of the group consisting of a top handler and a side picker;
- wherein said optical characteristic further includes a compression of at least one member of the group consisting of said container image and said optical enhancement; and
- wherein said gantry crane is a member of the group consisting of a quay crane, a rail gantry crane and a rubber tire gantry crane;
- wherein said rail kiosk is configured to wirelessly receive said member of said optical group from said optical characteristic system.

19. The apparatus of claim 17,
- wherein said second processor includes at least one instance of at least one member of the group consisting of a finite state machine, a neural network, an inferential engine, and a computer accessibly coupled to a computer readable memory including at least one member of a program system and an installation package configured to affect said program system;
- wherein said second means for communicating includes at least one instance of at least one member of the group consisting of a wireless network interface compliant with a wireless network protocol, a wireline network interface compliant with a wireline network protocol, and a radio compliant with a radio communications protocol.

20. The apparatus of claim 19, wherein said program system includes at least one member of the group consisting of the program steps of:
- operating said second means for communicating to receive said member of said optical group;
- creating said optical characteristic based upon said container image;
- creating said container code estimate from at least one of said members of said group consisting of said container image and said optical characteristic;
- creating said container chassis identifier estimate of said container chassis estimate of said container chassis holding said container for part of said transfer;
- creating a manifest for said rail car;
- creating said confirmation of said manifest; and
- creating said insurance record for said container.

21. An apparatus, comprising:
- a server interface configured to receive at least one member of an optical group
- from a container handler, configured to transfer a container at least twenty feet long to/from a rail car,
- to create at least one member of the group consisting of another of said member of said optical group,
  - a manifest for at least a rail car,
  - a confirmation of said manifest, and
  - an insurance record for said container created using at least one of said container images for each of at least one member of the face group of said container, said face group consisting of a top face, a bottom face, a front face, a back face, a left face and a right face, each of said container;
- wherein said server interface comprises
- a second processor communicatively coupled to a second means for communicating to receive said member of said optical group;
- wherein said optical group consists of the members of
  - a container image of at least part of at least one face of said container,
  - an optical characteristic derived from said container image,
  - an container code estimate of a container code on said face,
  - a rail car identifier of said rail car, and
  - a container chassis identifier of a container chassis holding said container;
- wherein said container handler is a member of the group consisting of a front end loader, a reach stacker, and a gantry crane;
- wherein at least one of said optical characteristic derived from said container image includes an optical enhancement of said container image.

22. The apparatus of claim 21, wherein said front end loader is a member of the group consisting of a top handler and a side picker;
- wherein said optical characteristic further includes a compression of at least one member of the group consisting of said container image and said optical enhancement; and
- wherein said gantry crane is a member of the group consisting of a quay crane, a rail gantry crane and a rubber tire gantry crane;
- wherein said container handler is further configured to wirelessly report said at least one member of said optical group; and
- wherein said server interface is further configured to wirelessly receive said member of said optical group from said container hander.

23. The apparatus of claim 21,
- wherein said second processor configured to create at least one member of the group consisting of
- said optical characteristic from said container image;
- said container code estimate from at least one member of the group consisting of said container image and said optical characteristic,
- said manifest for said rail car,
- said confirmation of said manifest, and
- said insurance record for said container.

24. The apparatus of claim 23,
- wherein said second processor includes at least one instance of at least one member of the group consisting of a finite state machine, a neural network, an inferential engine, and a computer accessibly coupled to a computer readable memory including at least one member of a program system and an installation package configured to affect said program system;

wherein said second means for wireless communicating includes at least one instance of at least one member of the group consisting of a wireless network interface compliant with a wireless network protocol, a wireline network interface compliant with a wireline network protocol, and a radio compliant with a radio communications protocol.

25. The apparatus of claim 24,
wherein said program system includes at least one member of the group consisting of the program steps of:

operating said second means for communicating to receive said member of said optical group;

creating said optical characteristic based upon said container image;

creating said container code estimate from at least one of said members of said group consisting of said container image and said optical characteristic;

creating said manifest for said rail car;

creating said confirmation of said manifest; and creating said insurance record for said container.

* * * * *